US012570250B2

(12) United States Patent
Friesen et al.

(10) Patent No.: US 12,570,250 B2
(45) Date of Patent: Mar. 10, 2026

(54) METHOD FOR DETERMINING AN OPTIMUM OR MAXIMUM-PERMISSIBLE SPEED OF A RAIL VEHICLE

(71) Applicant: KNORR-BREMSE SYSTEME FUR SCHIENEN-FAHRZEUGE GMBH, Munich (DE)

(72) Inventors: Ulf Friesen, Neubiberg (DE); Ralf Furtwängler, Munich (DE); Fabian Hauss, Pfaffenhofen (DE); Werner Machane, Pfaffenhofen (DE); Gerhard Stahlbauer, Munich (DE)

(73) Assignee: KNORR-BREMSE SYSTEME FUR SCHIENEN-FAHRZEUGE GMBH (DE)

( * ) Notice: Subject to any disclaimer, the term of this patent is extended or adjusted under 35 U.S.C. 154(b) by 41 days.

(21) Appl. No.: 18/279,780

(22) PCT Filed: Feb. 14, 2022

(86) PCT No.: PCT/EP2022/053548
§ 371 (c)(1),
(2) Date: Aug. 31, 2023

(87) PCT Pub. No.: WO2022/184411
PCT Pub. Date: Sep. 9, 2022

(65) Prior Publication Data
US 2024/0132028 A1 Apr. 25, 2024
US 2024/0227752 A9 Jul. 11, 2024

(30) Foreign Application Priority Data
Mar. 1, 2021 (DE) ..................... 10 2021 104 800.1

(51) Int. Cl.
*B60T 8/17* (2006.01)
*B60T 8/18* (2006.01)
(Continued)

(52) U.S. Cl.
CPC .......... *B60T 8/1705* (2013.01); *B60T 8/1893* (2013.01); *B60T 8/3245* (2013.01); *B60T 17/228* (2013.01); *B61L 15/0062* (2024.01)

(58) Field of Classification Search
CPC ...... B60T 17/20; B60T 17/228; B60T 8/1705; B60T 8/1893; B60T 8/3245; B61L 15/0062
See application file for complete search history.

(56) References Cited

U.S. PATENT DOCUMENTS 5,148,514 A * 9/1992 Arima ..................... G06N 3/063
708/801
6,823,242 B1 * 11/2004 Ralph ................... B60T 17/228
701/19
(Continued)

FOREIGN PATENT DOCUMENTS

| AT | 619312 A1 | 5/2018 |
| CN | 103249615 A | 8/2013 |
| WO | 2009074265 A1 | 6/2009 |

OTHER PUBLICATIONS

International Search Report corresponding to PCT/EP2022/053548 dated Jun. 29, 2022.
(Continued)

*Primary Examiner* — Carl C Staubach
(74) *Attorney, Agent, or Firm* — Barnes & Thornburg LLP

(57) ABSTRACT

A method for determining an optimum or maximum-permissible speed of a rail vehicle, dependent on a thermal state of at least one friction element of at least one friction brake of includes detecting at least one parameter which characterizes a current operating situation of the rail vehicle, determining or estimating a first influence on the thermal state of the at least one friction element based on the current operating situation of the rail vehicle, determining or esti-
(Continued)

mating a second influence on the thermal state of the at least one friction element, determining the optimum or maximum-permissible speed of the rail vehicle in such a way that an allowed friction-element maximum temperature of the at least one friction element is not exceeded, or the allowed friction-element maximum temperature of the at least one friction element is substantially obtained, at the at least one friction element under the first or second influence.

13 Claims, 5 Drawing Sheets

(51) Int. Cl.
B60T 8/32 (2006.01)
B60T 17/22 (2006.01)
B61L 15/00 (2006.01)

(56) References Cited

U.S. PATENT DOCUMENTS

| | | | | |
|---|---|---|---|---|
| 9,187,103 | B2* | 11/2015 | Furtwängler | F16C 19/525 |
| 2011/0054758 | A1* | 3/2011 | Bae | F16D 66/00 |
| | | | | 701/92 |
| 2014/0046514 | A1 | 2/2014 | Jennek et al. | |
| 2015/0015889 | A1* | 1/2015 | Berman | G01B 11/161 |
| | | | | 356/450 |
| 2015/0120163 | A1* | 4/2015 | Ohara | B60T 7/108 |
| | | | | 701/70 |
| 2017/0305577 | A1* | 10/2017 | Bill | B60T 17/22 |
| 2020/0017094 | A1* | 1/2020 | Gutschi | B60T 17/228 |
| 2024/0308483 | A1* | 9/2024 | Friesen | B60T 8/3245 |

OTHER PUBLICATIONS

Chinese Office Action corresponding to CN202280017235.4 dated Jan. 28, 2026.

* cited by examiner

400

An optimum speed v_op_local at which, in the case of a notional braking, the brake disc temperature assumes exactly the value T_max, is determined for each local braking unit with the aid of a fundamental behavior model

500

Criteria-based assessment of the locally determined speeds and consolidation to a train-wide optimum speed v_opt

600

Display unit

700

Control unit

METHOD FOR DETERMINING AN OPTIMUM OR MAXIMUM-PERMISSIBLE SPEED OF A RAIL VEHICLE

CROSS REFERENCE AND PRIORITY CLAIM

This patent application is a U.S. National Phase of International Patent Application No. PCT/EP2022/053548 filed Feb. 14, 2022, which claims priority to German Patent Application No. 10 2021 104 800.1, the disclosure of which being incorporated herein by reference in their entireties.

FIELD

Disclosed embodiments relate to a method for determining an optimum or maximum-permissible speed of a rail vehicle depending on a thermal condition of at least one friction element of at least one friction brake of the rail vehicle.

BACKGROUND

Rail vehicles often have electrodynamic brakes and additionally a friction braking system (blending), wherein the electrodynamic brakes are used primarily to reduce wear on the friction braking system. Some rail vehicles have a friction braking system but no electrodynamic brakes.

Therefore, in the event of a complete or partial failure of the electrodynamic brakes, braking, in particular service braking, may have to be performed primarily or exclusively using the friction braking system. The higher the vehicle weight that is braked by the friction braking system and the brake application speed of the rail vehicle, i.e., the higher the speed at which friction braking is started, the higher the energy input and thus the temperature increase of the brake disks and brake pads. As a consequence, the fluctuation of the coefficient of friction $\mu$ of the brake disk-brake pad pairing increases and thus the probability that the coefficient of friction $\mu$ will decrease. At high brake application speeds, there is therefore a risk that the braking distances will increase due to brake fade.

SUMMARY

Disclosed embodiments provide a method which, on the one hand, offers a higher level of safety against overheating of the friction braking system, but, on the other hand, allows the rail vehicle to travel at the highest possible speed, i.e., to travel "at the limit" at optimum speed.

BRIEF DESCRIPTION OF FIGURES

Exemplary embodiments are shown below in the drawing and explained in greater detail in the following description. In the drawings.

DETAILED DESCRIPTION

Figure 1:
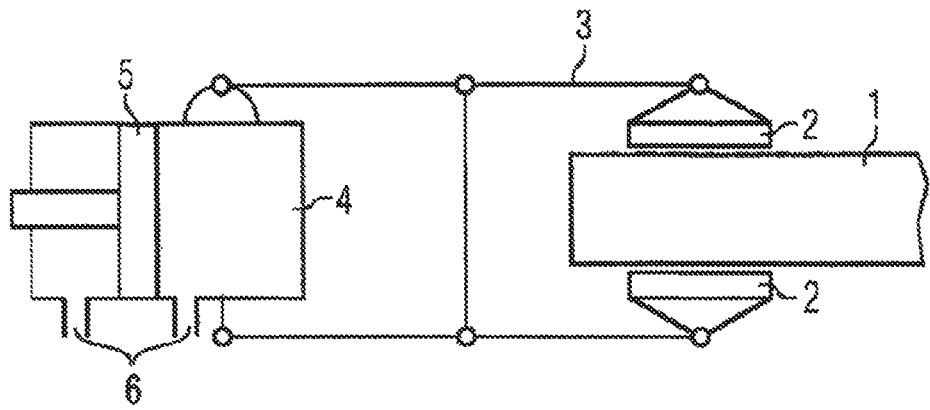
FIG. 1 shows a schematic representation of an exemplary design of a pneumatic friction braking device with a brake disc and a brake caliper with brake pads.

Brake fade is understood here to mean the reduction in the braking effect of a friction braking system due to influences such as heating or wetness. To avoid brake fade due to heating, the maximum speed of the rail vehicle is limited by a maximum-permitted speed depending on the situation.

For this purpose, the generic WO 2018/054736 A1 proposes a method and a device for influencing a kinematic behavior of a vehicle, with at least one friction braking system, in which a braking effect is generated by pressing at least a first friction element and a second friction element against one another, wherein at least temperatures of at least the first friction element are calculated from information about a speed, a braking pressure and an external temperature of the vehicle, as well as about absolute times, and wherein heat conduction through the at least first friction element as well as speed-dependent cooling of the at least first friction element are taken into account in this calculation, and wherein the kinematic behavior of the vehicle is influenced on the basis of this calculation.

By contrast, the disclosed embodiments provide a method which, on the one hand, offers a higher level of safety against overheating of the friction braking system, but, on the other hand, allows the rail vehicle to travel at the highest possible speed, i.e., to travel "at the limit" at optimum speed.

A maximum-permissible speed with regard to the thermal condition or the thermal load capacity of the at least one friction element simultaneously represents an optimum speed, because then the "thermal reserve" of the at least one friction element is utilized to the maximum without the latter suffering damage due to overheating. The rail vehicle can then travel at the maximum speed that is just permitted with regard to the thermal load capacity of the at least one friction element. It is clear here that a rail vehicle has several friction brakes, for example in the form of disk brakes and/or block brakes, so that, for example, the friction brake with the highest thermal load as the (thermally) weakest link can form the benchmark for determining the optimum or maximum-permissible speed of the rail vehicle. For the sake of simplicity, the maximum-permissible speed or the optimum speed of the rail vehicle is denoted as vopt in the following.

Further, it should be ensured at all times during operation or while the rail vehicle is in motion that a defined braking mode with a defined braking effect, such as emergency, automatic or rapid braking, can be carried out without the friction-element temperature (e.g., brake disk temperature) reaching a critical range as a result of the temperature lift $\Delta T$ thereby generated.

The term "rail vehicle" is used here to refer to any type of track-bound vehicle with a prime mover, in particular traction units, or without a prime mover, such as railcars in rail vehicle combinations, as well as a rail vehicle combination consisting of several rail vehicles.

Disclosed embodiments proceed from methods for determining an optimum or maximum-permissible speed vopt of a rail vehicle depending on a thermal condition of at least one friction element of at least one friction brake of the rail vehicle, comprising at least detecting at least one parameter characterizing a current operating situation of the rail vehicle, and determining or estimating a first influence on the thermal condition of the at least one friction element based on the current operating situation of the rail vehicle.

Disclosed embodiments may further include determining or estimating a (in particular speed-dependent) second influence on the thermal condition of the at least one friction element which, in addition to the first influence, would influence the thermal condition of the at least one friction element if braking with a defined braking mode were to be carried out notionally or theoretically in the current operating situation of the rail vehicle, and determining the optimum or maximum-permissible speed vopt of the rail vehicle in such a way that, at the at least one friction element under the first influence and under the second influence, wherein a permitted friction-element maximum temperature Tmax of the at least one friction element is not exceeded, or the permitted friction-element maximum temperature Tmax of the at least one friction element is substantially obtained.

Disclosed embodiments ensure that a defined braking mode, such as emergency braking, can be carried out at any time during travel of the rail vehicle without the temperature of the at least one friction element thereby exceeding the permitted friction-element maximum temperature Tmax. The additional temperature difference ΔT resulting from the defined braking mode is therefore taken into account as a second influence when determining the optimum speed vopt.

Before the defined braking mode is actually executed, an estimate or calculation of the temperature deviation ΔT can optionally be carried out at any time and/or continuously during travel, but without the defined braking mode actually being executed. It is therefore not absolutely necessary that the defined braking mode is then actually executed in parallel with the current operating situation. An estimate or the calculation of the temperature difference ΔT based on the notional braking is carried out for safety reasons in order to avoid a temperature overload of the at least one friction element of the friction braking system at any time during travel, without it being absolutely necessary that the defined braking mode is actually executed.

The starting situation is therefore the current operating situation, in which the rail vehicle travels at a certain speed and load and under certain environmental and route conditions along a route that is, for example, level or has a certain downhill gradient or a certain uphill gradient. For example, the speed, the load, the downhill gradient or the uphill gradient are then recorded as parameters. The current operating situation may also comprise that a service braking deviating, for example, from the defined braking mode has already been triggered, wherein the current braking pressure and/or the current braking force and/or the current braking torque is (are) then recorded as a parameter, for example. Alternatively, no braking can take place in the current operating situation, in which case the parameters relating to the current braking pressure and/or the current braking force and/or the current braking torque are zero. As an alternative, braking can also already be performed with a defined braking mode in the current operating situation.

Based on this current operating situation, the first influence, for example as a first temperature component Tcurrent of a predictive friction-element temperature Tpred, can then be calculated on the basis of the current operating situation of the rail vehicle or estimated by a model. This first temperature component Tcurrent then corresponds to the temperature that actually occurs at the at least one friction element based on the current operating situation. The first temperature component Tcurrent is calculated continuously, for example, even if a particular braking mode is currently being performed.

A model is to be understood as any physical-mathematical model which can be implemented by a storable program in a computing unit and with the help of which, based on the parameters, the mentioned variables can be calculated.

The parameter and/or the characteristic for characterizing the current operating situation is in particular not a temperature variable. Then, the first temperature component Tcurrent of the predictive friction-element temperature Tpred can be estimated or calculated from the at least one parameter using a model, wherein, however, the first temperature component Tcurrent is not measured by a temperature sensor, for example. Alternatively or additionally, however, at least one temperature sensor could be used for direct or indirect detection of the first temperature component Tcurrent.

In addition, for example, the temperature difference ΔT described above, which represents the second influence, is taken into account as a second temperature component ΔT of the predictive friction-element temperature Tpred or as a second influence. The temperature difference ΔT as the second temperature component of the predictive friction-element temperature Tpred is, in particular, speed-dependent. The second temperature component ΔT would occur in addition to the first temperature component Tcurrent at the at least one friction element of the friction braking system if, in the current operating situation of the rail vehicle, braking were to be notionally carried out with a defined braking mode that has not or not yet been requested in the current operating situation but could be requested in the current operating situation.

For example, the predictive friction-element temperature Tpred of the at least one friction element of the friction braking system can be determined as the sum of the first temperature component Tcurrent and the second temperature component ΔT. This predictive friction-element temperature Tpred would therefore theoretically or notionally be estimated or calculated at or in the at least one friction element when the defined braking mode is executed in the current operating situation.

In particular, disclosed embodiments are based on the consideration that a second temperature component or temperature difference ΔT available as a "temperature reserve", which is still available, for example, for increasing the current speed of the rail vehicle up to the optimum speed vopt, corresponds to a difference between the permitted friction-element maximum temperature Tmax of the at least one friction element and the first temperature component Tcurrent:

$$\Delta T = T\text{max} - T\text{current} \tag{1}$$

Operation of the rail vehicle at the optimum speed vopt or at a speed v lower than the optimum speed vopt then results in the predictive friction-element temperature Tpred always being or becoming smaller than or equal to a permitted friction-element maximum temperature Tmax of the at least one friction element of the friction brake, even when the defined braking mode, such as emergency, automatic or rapid braking, is executed.

As already indicated above, the defined braking mode includes at least one of the following braking modes: an emergency braking, an automatic braking, a rapid braking, a hazard braking.

According to DIN EN 14478:2005-06, these braking modes are defined as follows:

Rapid Braking

Applying a predefined braking force using all serviceable brakes that ensures the required braking capacity and the required safety level. The braking capacity and safety level of rapid braking described in vehicle-specific European Standards (EN) are usually equal to or greater than the corresponding values of maximum service braking (full braking), provided that the required frictional adhesion and other necessary conditions are met. The term may change depending on the type of train or traffic system and the way in which the rapid braking is activated, as explained below:

Rapid braking: rapid braking triggered by the train driver;

Hazard braking: rapid braking in rapid transit braking systems;

Automatic braking: rapid braking automatically activated by signal or protection systems (e.g. train control systems);

Emergency braking: rapid braking initiated by passengers or the train crew by actuating an emergency brake pull handle. The emergency brake pull handle is the actuation interface of a passenger alarm system.

Full braking: greatest achievable level of service braking

Safety braking: specific to mass transit braking systems, braking with a higher safety level than service and hazard braking. Braking performance can be lower than maximum service braking or hazard braking.

Service braking: application of an adjustable braking force to regulate the speed of a train, including speed reduction, stopping, and temporary standstill; it is the most commonly used braking mode.

As already indicated above, the thermal condition of the at least one friction element can optionally be represented by a predictive friction-element temperature Tpred of the at least one friction element, which consists of a first temperature component Tcurrent and a second, in particular speed-dependent temperature component $\Delta T$, wherein the first temperature component Tcurrent of the predictive friction-element temperature Tpred is estimated or determined as the first influence on the basis of the current operating situation of the rail vehicle, and in that a functional relationship r is defined between the first temperature component Tcurrent and the optimum speed vopt of the rail vehicle, in which the second temperature component $\Delta T$ of the predictive friction-element temperature Tpred is taken into account as a second influence, and wherein the optimum or maximum-permissible speed vopt of the rail vehicle is determined on the basis of the functional relationship r depending on the first temperature component Tcurrent.

Also, the thermal condition of the at least one friction element can be represented by a predictive friction-element temperature Tpred of the at least one friction element, wherein, as a first influence, a first temperature component Tcurrent of the predictive friction-element temperature Tpred is estimated or determined on the basis of the current operating situation of the rail vehicle, and in that, as a second influence, a (in particular speed-dependent) second temperature component $\Delta T$ of the predictive friction-element temperature Tpred is estimated or determined, which would occur in addition to the first temperature component Tcurrent at the at least one friction element if braking with a defined braking mode were to be carried out notionally or theoretically in the current operating situation of the rail vehicle, wherein the optimum or maximum-permissible speed vopt of the rail vehicle is determined in such a way that a sum of the first temperature component Tcurrent and the second temperature component $\Delta T$ is smaller than a permitted friction-element maximum temperature Tmax of the at least one friction element, or substantially corresponds to the permitted friction-element maximum temperature Tmax of the at least one friction element.

Optionally, if, in the current operating situation of the rail vehicle, it is determined that the sum of the first temperature component Tcurrent and the second temperature component $\Delta T$ is less than the permitted friction-element maximum temperature Tmax, in the current operating situation the current speed v of the rail vehicle is increased until it substantially corresponds to the optimum speed vopt, or, if it is determined, or if it is determined that the sum of the first temperature component Tcurrent and the second temperature component $\Delta T$ is greater than the permitted friction-element maximum temperature Tmax, the current speed v of the rail vehicle is reduced in the current operating situation until it substantially corresponds to the optimum or maximum-permissible speed vopt.

According to a development of the method, if it is determined that the first temperature component Tcurrent alone is already greater than the permitted friction-element maximum temperature Tmax of the at least one friction element, a warning signal and/or a diagnostic signal is generated, and/or in the current operating situation, the current speed v of the rail vehicle is reduced until the first temperature component Tcurrent is less than or equal to the permitted friction-element maximum temperature Tmax of the at least one friction element.

Also, the optimum speed vopt of the rail vehicle can be automatically set by a control device which controls the traction and/or the brake of the rail vehicle, and/or indicated visually and/or acoustically on a display device.

In particular, the parameter characterizing the current operating situation may be at least one of the following parameters: the current speed of the rail vehicle, the current braking force, the current braking torque, the current braking pressure, the ambient temperature of the rail vehicle, the current load and/or loading of the rail vehicle, an uphill or downhill gradient of the route traveled by the rail vehicle, or a service braking, with a braking effect that is lower than the braking effect for the defined braking mode.

According to a development, the at least one friction element may include a brake disc and/or a brake pad of a disc brake of the friction braking system, or a wheel tread and/or a brake block of a block brake unit of the friction braking system.

Also, the defined braking mode may include at least one of the following braking modes: An emergency braking, an automatic braking, a rapid braking, a hazard braking.

According to a development, the rail vehicle may comprise a plurality of friction brakes each having at least one friction element, wherein for each of the plurality of friction brakes a local optimum or maximum-permissible speed v_opt_local is determined, and wherein the lowest or smallest local optimum or maximum-permissible speed v_opt_local_min among the local optimum or maximum-permissible speeds v_opt_local of the plurality of friction brakes is used as the optimum or maximum-permissible speed vopt of the rail vehicle.

Various methods can be used for a consolidation:

In the simplest case, as described above, the lowest or smallest local optimum or maximum allowable speed v_opt_local_min among the local optimum or maximum allowable speeds v_opt_local of the multiple friction brakes is used;

In addition or alternatively, procedures for the elimination of statistical outliers are available. For example, all determined values for the local optimum or maximum-permissible speeds v_opt_local can be sorted in a series of increasing values, and an averaged or highest value from the smallest X percent (wherein X is a predefined percentage) can then be used.

With this understanding of the disclosed embodiments in mind, a detail of a friction braking system of a rail vehicle shown schematically in FIG. 1 shows a pneumatic disc brake. This comprises a first friction element 1, which is designed, for example, as a brake disc mounted on a wheelset shaft (not shown) of the rail vehicle, and a brake caliper. The brake caliper has a second friction element 2, which comprises two brake pads. Furthermore, the brake caliper has a brake cylinder 4 with compressed air connections 6 and a piston 5 as well as a linkage 3. The piston 5 actuates the linkage 3, as a result of which the brake pads arranged on the linkage 3, i.e. the second friction element 2, are pressed against the brake disc, i.e. the first friction element 1. Via the compressed air connections 6, the piston 5 for actuating the linkage 3 is supplied with compressed air from a compressed air system (not shown) of the rail vehicle. The compressed air system has components for controlling the friction braking device, such as compressors, brake control units, etc.

Figure 2:
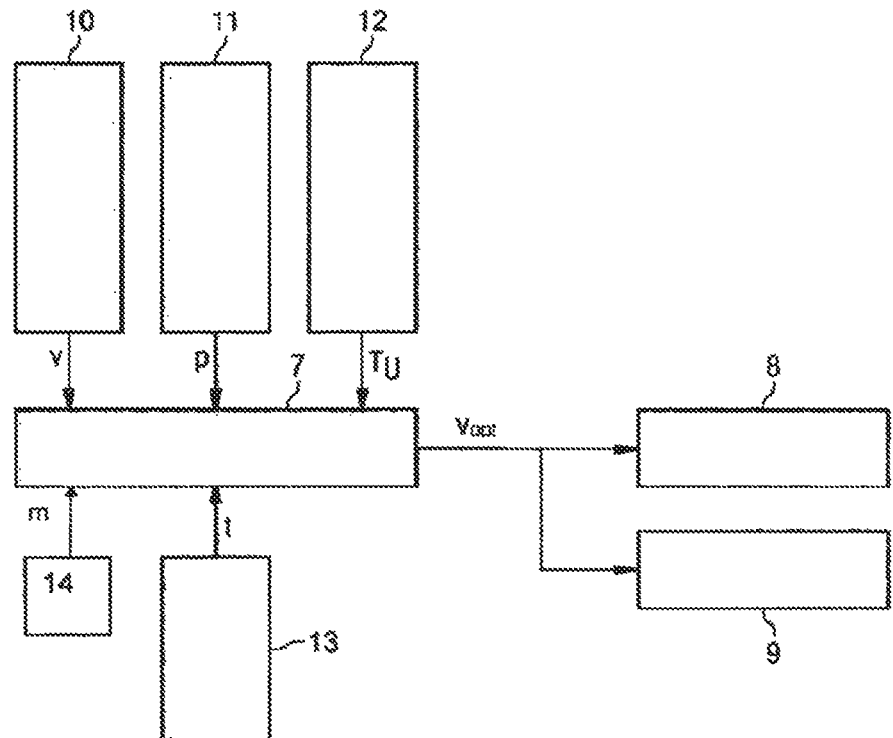
FIG. 2 shows a functional diagram of an exemplary embodiment of a device according to an embodiment of the method.

An optional embodiment of a device for determining the optimum or maximum-permissible speed vopt of the rail vehicle has a computing unit 7 shown in FIG. 2, in which a model is implemented that performs thermal calculations in accordance with the method according to the disclosed embodiments. The device further comprises a control unit 8 shown in FIG. 2, with which the kinematic behavior of the rail vehicle is influenced on the basis of results of the thermal calculations.

Pressing the first friction element 1 and the second friction element 2 against each other causes a braking effect on the rail vehicle. This results in a conversion of kinetic energy of the rail vehicle into heat, causing a temperature increase of the first friction element 1 and the second friction element 2. Releasing the first friction element 1 and the second friction element 2 from each other causes a reduction or a cancellation of the braking effect on the rail vehicle. This, together with an effect of known heat transfer principles, reduces the temperatures in the first friction element 1 and in the second friction element 2, i.e., the first friction element 1 and the second friction element 2 cool down. The described temperature behavior is calculated or estimated by the method according to the disclosed embodiments, and the optimum or maximum-permissible speed vopt is then determined in the computing unit 7 on the basis of the temperature behavior.

The device comprises a travel speed sensor 10 for detecting a travel speed v, a braking pressure sensor 11 for detecting a braking pressure p and thus a braking force FB, an ambient temperature sensor 12 for detecting an ambient temperature Tu, a time measuring device 13 for detecting an absolute time t, and a load braking device 14, which are connected to a computing unit 7 via corresponding data lines in order to make the sensor signals available to the model. The travel speed sensor 10, the braking pressure sensor 11, and the ambient temperature sensor 12 are arranged in a chassis (not shown) of the rail vehicle. However, it is also conceivable that the travel speed v and the braking pressure p are read into the computing unit 7 from a data bus system of the rail vehicle. Furthermore, it is also conceivable that the braking pressure p is determined approximately from a deceleration and a mass to be braked. The deceleration is calculated here, for example, by differentiation of the travel speed v or is ascertained via acceleration sensors, and the mass m to be braked is determined via a load braking device 14. Furthermore, it is also conceivable that, instead of a travel speed v, an angular speed of a wheel or a wheel speed is detected and the thermal calculations are performed with this angular speed or this wheel speed. Furthermore, configuration data of the rail vehicle are stored in a memory (not shown here) of the computing unit 7 and are also available to the model. The memory also stores a permitted friction-element maximum temperature Tmax, for example of the first friction element 1.

The time measuring device 13 and the computing unit 7 are implemented in a control unit (not shown), and are arranged in a railcar body (not shown). The computing unit 7 receives data relating to the travel speed v from the travel speed sensor 10, data relating to the braking pressure p or braking force PB from the braking pressure sensor 11, data relating to the ambient temperature Tu from the ambient temperature sensor 12, data relating to the vehicle mass m from the load braking device 14, and data relating to the absolute time t (time stamp) from the time measuring device 13, and performs computing operations in accordance with the method according to the disclosed embodiments. Furthermore, configuration data of the rail vehicle stored in the memory of the computing unit 7 can also be included in the computing operations of the model.

Figure 3A:
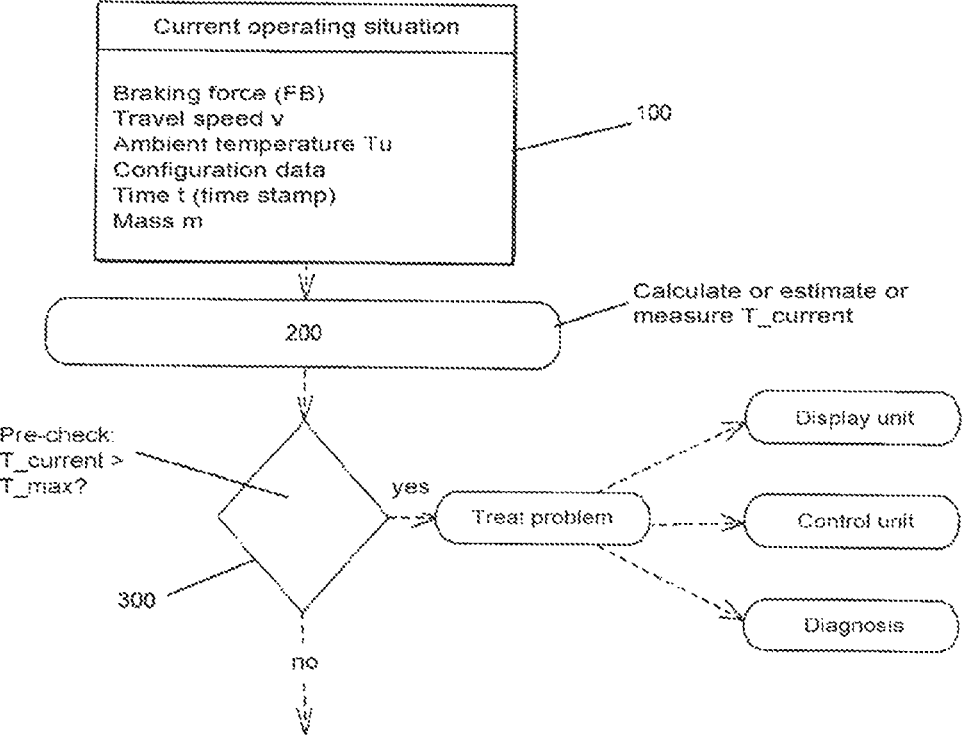
FIGS. 3A/B show a flow chart of the method according to an embodiment.
Figure 3B:
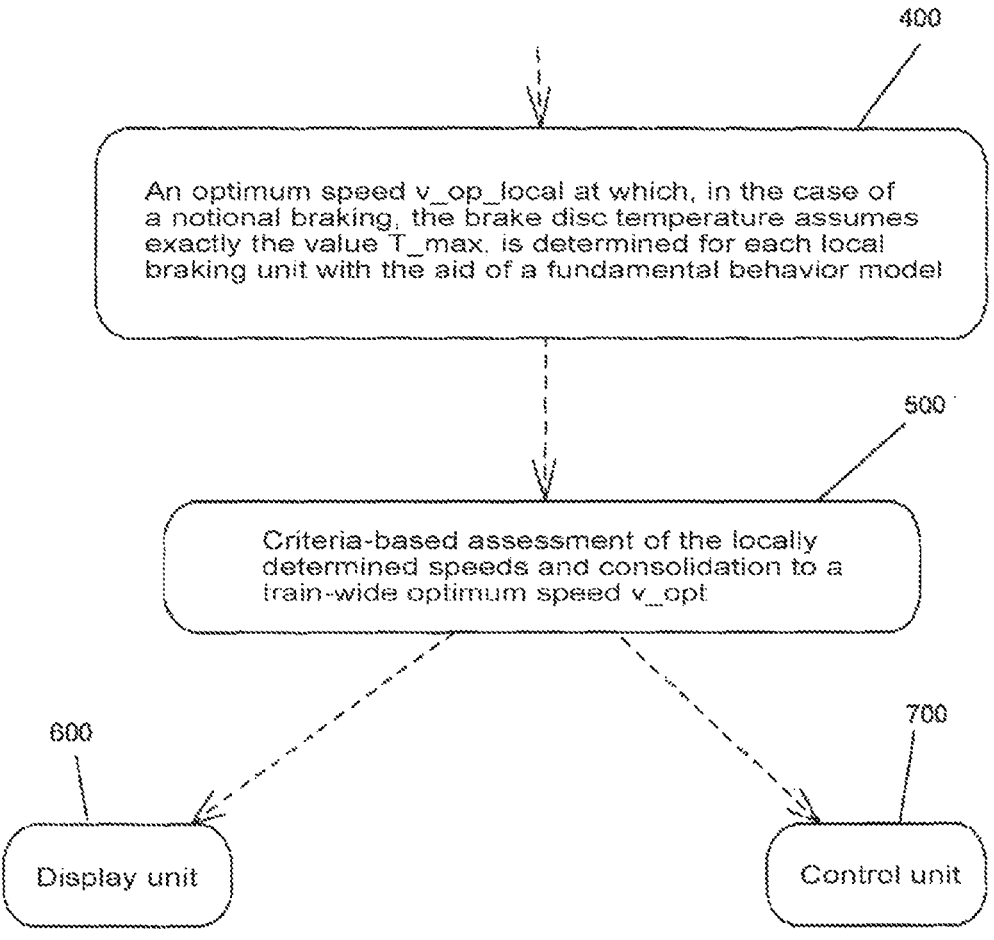

Here, for example, using the travel speed v, the braking force FB, the ambient temperature Tu, the absolute time t, the mass m and the configuration data of the rail vehicle, thermal conditions of the friction braking device shown in FIG. 1 are determined in accordance with the description for FIGS. 3A and 3B, in particular of its first friction element 1.

The computing unit 7 is connected via corresponding data lines to a control unit 8 implemented in a vehicle control system (not shown) and arranged in the car body. The control unit 8 influences the kinematic behavior of the rail vehicle in such a way that, for example, the rail vehicle maintains its current travel speed v or is automatically braked or accelerated by signals generated on the basis of a thermal calculation in the model implemented in the computing unit 7 and transmitted to the control unit 8. In particular, the optimum speed vopt is set or adjusted by the control unit 8. The braking can optionally be performed by controlling the traction so as not to increase the brake disc temperature and wear by engagement of the disc brakes. This may influence the thermal condition of the disc brakes of the rail vehicle.

Furthermore, a display unit 9 connected to the computing unit 7 via a signal line is arranged in a driver's cab (not shown) of the rail vehicle. On this unit, indications or warnings determined on the basis of thermal calculations in accordance with the method according to the disclosed embodiments described below are displayed to a driver, in particular the optimum speed vopt. This can also be used to monitor the thermal condition of the friction brakes or the disc brakes.

It is also possible for the display unit 9 to additionally display speed limits, permissible decelerations or permissible driving profiles (time sequences of acceleration and deceleration portions as well as phases with constant driving speed v or phases of standstill).

To warn of unfavorable kinematic behavior of the rail vehicle with regard to thermal conditions of the friction brakes, acoustic and/or optical signals can be output additionally to the driver via an audio output device of the display unit 9.

Various embodiments and arrangements of the travel speed sensor 10, the braking force sensor 11, the ambient temperature sensor 12, the time measuring device 13, the display unit 9, the computing unit 7, the load braking device 14 and the control unit 8 are conceivable here. It is conceivable, for example, as shown in FIG. 2, to arrange the computing unit 7 and the control unit 8 separately, or to integrate the computing unit 7 and the control unit 8 in one structural unit.

Furthermore, it is also conceivable that, for example, the computing unit 7 is arranged in a control station and communicates with the rail vehicle via radio signals, i.e., for example, receives information about its travel speed v and, on the basis of a thermal calculation performed in accordance with the disclosed embodiments, sends instructions for limiting the travel speed v to the maximum-permissible or optimum travel speed vopt.

FIGS. 3A and 3B show a flow chart of an embodiment of the method according to the disclosed embodiments for determining the optimum or maximum-permissible speed vopt of the rail vehicle depending on the thermal condition of, for example, the first friction element 1 in the form of the brake disc of the disc brake. It is clear here that the disc brake shown in FIG. 1 is merely representative of a plurality or all of the disc brakes of the rail vehicle. In particular, a plurality or all of the disc brakes are thermally monitored to determine the optimum or maximum-permissible speed vopt of the rail vehicle.

For this purpose, parameters characterizing a current operating situation of the rail vehicle are acquired in a step 100. These include, for example, the current driving speed v, the current braking force FB, the current ambient temperature Tu, data relating to the absolute time t (time stamp), the current mass m of the rail vehicle, and the configuration data of the rail vehicle.

In the model of the computing unit 7, a first temperature component Tcurrent of a predictive friction-element temperature Tpred of, for example, the first friction element 1 is then calculated or estimated in a step 200, for example on the basis of the above-mentioned current operating situation of the rail vehicle. Alternatively or also additionally, the first temperature component Tcurrent can also be measured directly by a temperature sensor. The first temperature component Tcurrent then corresponds, for example, to the surface temperature which is calculated or estimated by the model and which occurs at the surface of the first friction element 1 on the basis of the actual current operating situation.

In a subsequent step 300, the model then checks whether the first temperature component Tcurrent is greater than the permitted friction-element maximum temperature Tmax of the first friction element 1. If this is the case ("yes"), a problem treatment is performed. For example, the computing unit 7 generates an alarm signal or warning signal, which is then output at the display unit 9, for example visually, and which represents or includes, for example, an indication of a critical thermal condition of the first friction element 1. Alternatively or additionally, an influencing signal could also be generated, which is output to the control unit 8, which controls the traction and/or the brake of the rail vehicle. By the influencing signal, the travel speed v and/or the deceleration a of the rail vehicle is then reduced, for example, until the first temperature component Tcurrent is less than or equal to the permitted friction-element maximum temperature Tmax of the first friction element 1. In addition, a diagnosis can also be carried out to determine whether, for example, an advanced state of wear of the disc brake has caused the relatively high temperature.

If, however, this is not the case ("no"), then in a step 400 a maximum-permissible or optimum speed v_opt_local of the rail vehicle is determined or ascertained with the aid of a behavior model implemented in the computing unit 7 for each friction brake, for example, which is designated there as a braking unit, at which speed, in the case of a notional braking with a specific braking mode, here for example with an emergency braking, the temperature T here for example of the first friction element 1 substantially or exactly assumes or reaches the permitted friction-element maximum temperature Tmax of this first friction element 1.

Various approaches are possible for this. As already indicated at the outset, a predictive friction-element temperature Tpred is (theoretically) established at the first friction element, for example as the surface temperature of the first friction element 1, if the rail vehicle is notionally braked with a defined braking mode in the current operating situation. This predictive friction-element temperature Tpred therefore represents a kind of "prediction" of the temperature of the first friction element 1, which it assumes when the rail vehicle is theoretically or notionally braked with the defined braking mode.

This predictive friction-element temperature Tpred can therefore be determined in principle as the sum of the first temperature component Tcurrent and the second temperature component or temperature difference ΔT:

$$\text{Tpred}=\text{Tcurrent}+\Delta T \tag{2}$$

The second temperature component ΔT of the predictive friction-element temperature Tpred then represents the temperature component which would occur at the first friction element 1 solely due to the notional braking with the defined braking mode. This second temperature component ΔT would therefore occur in addition to the first temperature component Tcurrent at the surface of the first friction element 1 if braking with a defined braking mode were to be carried out notionally or theoretically in the current operating situation of the rail vehicle. This defined braking mode has not or not yet been requested in the current operating situation, for example, but could be requested in the current operating situation.

Figure 4:
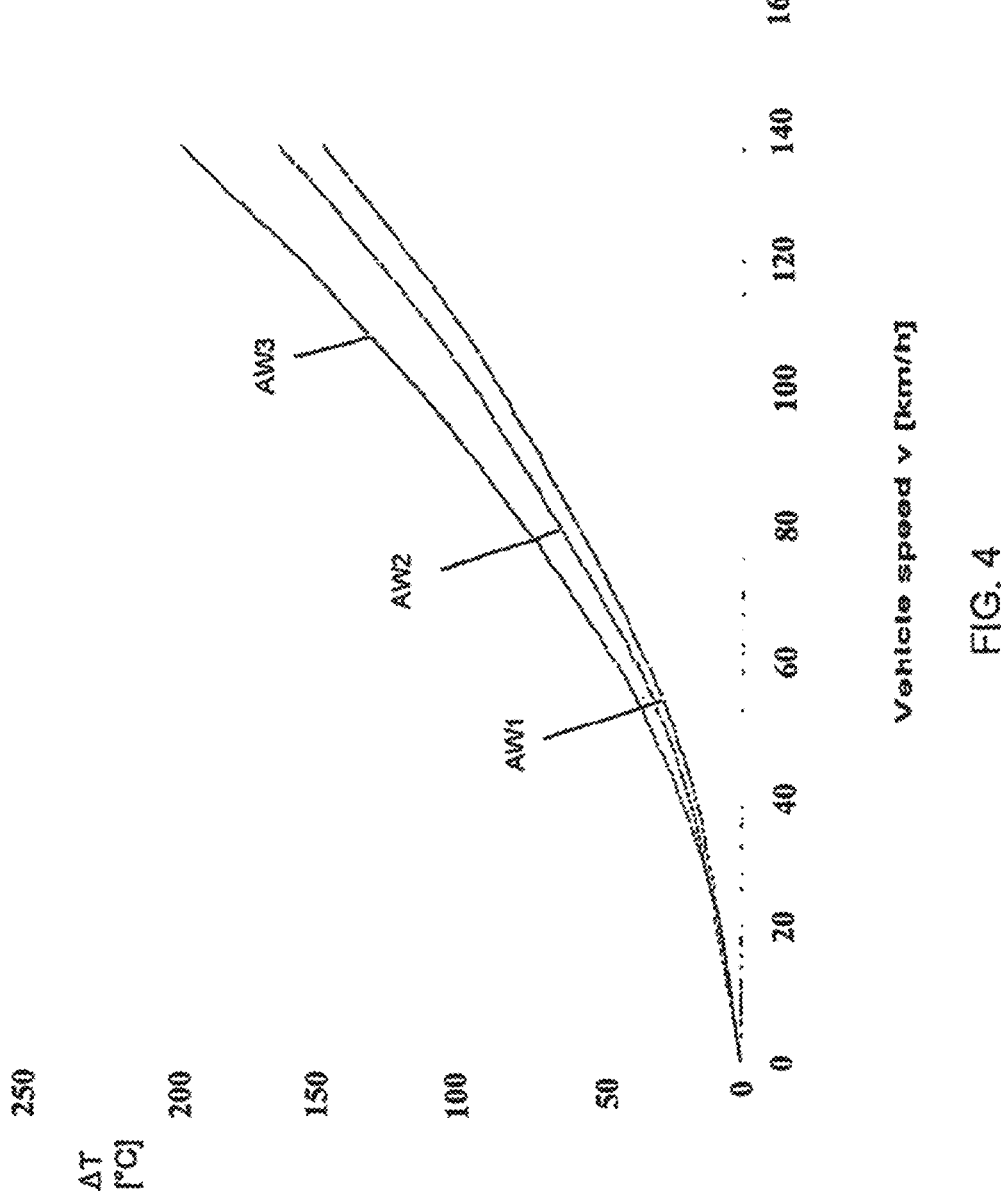
FIG. 4 shows a diagram showing the dependence of a second temperature component $\Delta T$ of a predictive temperature Tpred of a friction element of the friction brake from FIG. 1 on the travel speed v and loading condition.

The second temperature component ΔT of the predictive friction-element temperature Tpred is dependent in particular on the driving speed v, which is present in the current operating situation at time t (time stamp). FIG. 4 shows a diagram which is stored, for example, in a characteristic map in the computing unit 7 and in which the dependence of the second temperature component ΔT on the driving speed v is shown for various load cases defined in the generally known applicable regulations, for example AW1: low load, AW2: medium load and AW3: high load. Of course, other load cases can also be considered in the characteristic map. As can be seen, the second temperature component ΔT also increases with increasing travel speed v, which (also) characterizes the current operating situation. Consequently, the diagram in FIG. 4 assigns a specific second temperature component ΔT of the predictive friction-element temperature Tpred to the speed v and load of the rail vehicle in the current operating situation in the manner of a characteristic map.

Optionally, however, the second temperature component ΔT is not explicitly determined in the process. As already explained above, the second temperature component or temperature difference ΔT is available as a "temperature reserve", which corresponds to a difference between the permitted friction-element maximum temperature Tmax here of the first friction element 1 and the first temperature component Tcurrent:

$$\Delta T=T\text{max}-\text{Tcurrent} \tag{3}$$

11

Operation of the rail vehicle at the optimum speed vopt or at a speed v less than the optimum speed vopt should then result in the predictive friction-element temperature Tpred in particular always being or becoming less than or equal to a permitted friction-element maximum temperature Tmax of the at least one friction element of the friction brake, even when the defined braking mode such as emergency, automatic or rapid braking is executed.

Figure 5:
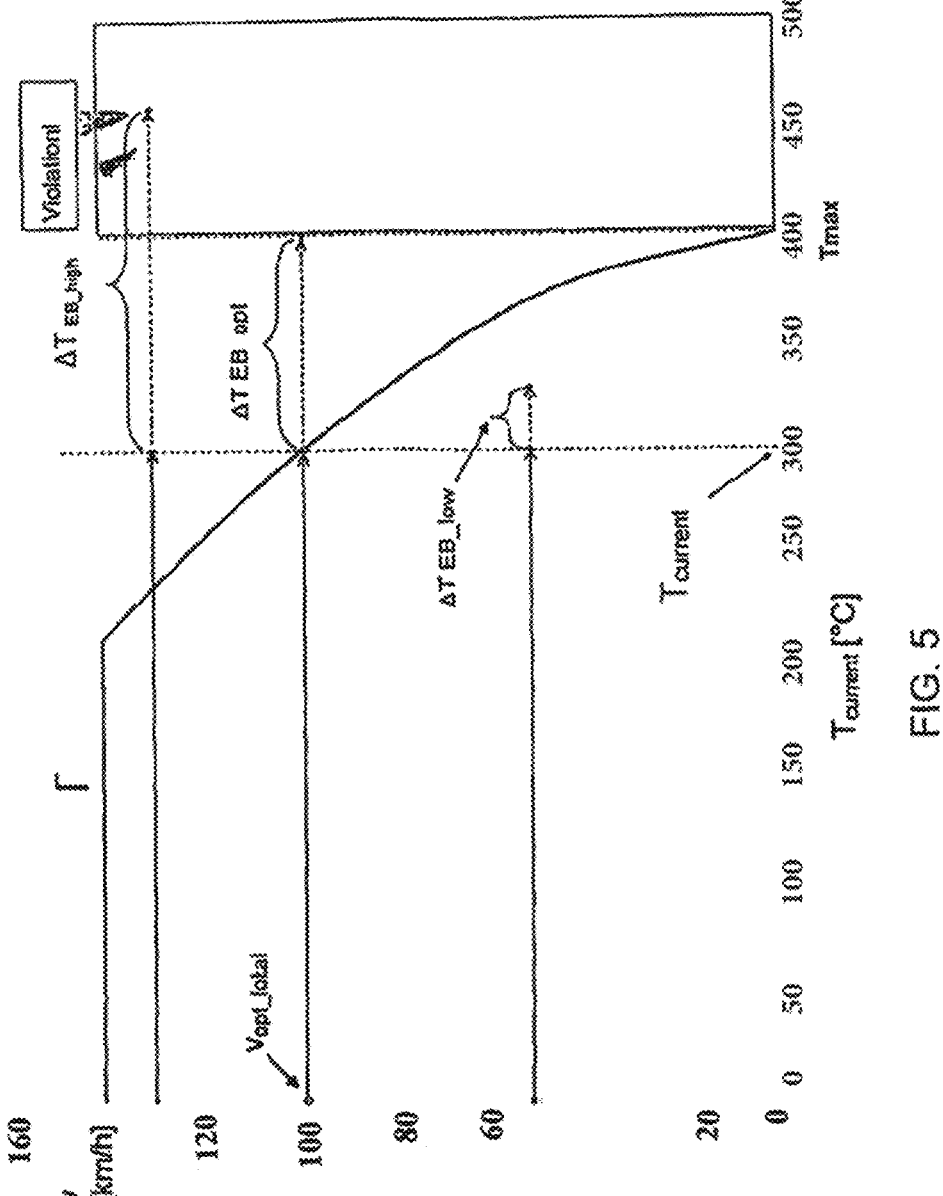
FIG. 5 shows a functional relationship r between the speed v of a rail vehicle and a first temperature component Tcurrent of the predictive temperature Tpred of a friction element of the friction brake from FIG. 1.

For this purpose, the method optionally defines or determines a functional relationship r, shown in FIG. 5, between the first temperature component Tcurrent and the optimum speed vopt of the rail vehicle, in which the second temperature component $\Delta T$ of the predictive friction-element temperature Tpred is already taken into account. Then, the optimum speed vopt of the rail vehicle is determined on the basis of the functional relationship r depending on the first temperature component Tcurrent.

In the example illustrated on the basis of FIG. 5, the rail vehicle is traveling at a speed of 56 km/h and the first temperature component Tcurrent of the brake disk 1 of the disk brake in FIG. 1, which is used here as the first friction element, for example, is 300° C. This first temperature component Tcurrent is measured here using a temperature sensor, for example. Alternatively or additionally, it can also be estimated or calculated from other variables by a model implemented in the computing unit 7.

The temperature difference or second temperature component $\Delta T$ resulting from a notional emergency braking in this case corresponds to the distance of the curve or function r from the permitted friction-element maximum temperature Tmax, which is symbolized by a dashed line in FIG. 5. At a speed v=56 km/h and Tcurrent=300° C., the temperature difference or second temperature component is $\Delta T$ 30° C., which is denoted as $\Delta TEB\_low$ in FIG. 5. The current speed v=56 km/h, which is encompassed by the current operating situation, is therefore too low for the permitted friction-element maximum temperature Tmax=400° C. to be reached at the brake disk 1 assuming a notional emergency braking.

This means that, based on the thermal load capacity of brake disk 1 alone, the rail vehicle could travel faster than at the current speed v=56 km/h.

The optimum or maximum-permissible speed vopt with regard to the thermal load capacity of brake disk 1 can then be deduced from the diagram in FIG. 5 by drawing a vertical straight line upwards starting from the current operating situation $$\left( v = \frac{56 \text{ km}}{h}, \text{Tcurrent} = 300° \text{ C.} \right).$$

At the intersection of this vertical straight line with the function r is then the operating situation or the operating point of the rail vehicle at which the predictive temperature Tpred is equal to the permitted friction-element maximum temperature Tmax. The second temperature component $\Delta T$ is equal to 100° C. at this intersection and is designated as $\Delta TEB\_opt$ in FIG. 5. At this intersection, viewed in the vertical direction, there is therefore the optimum or maximum-permitted speed vopt_local, which is, for example, 100 km/h, i.e. only in relation to the disc brake under consideration can the rail vehicle be driven at the "thermal limit" with $$v = 100 \frac{\text{km}}{h},$$

12 without the permitted friction-element maximum temperature Tmax of the brake disc 1 of this disc brake being exceeded by a notional emergency braking.

For the speed range $$v > 100 \frac{\text{km}}{h},$$

however, the predictive temperature Tpred is greater than the permitted friction-element maximum temperature Tmax of the brake disk 1 (Tpred>Tmax). Then, the thermally critical range is entered. The second temperature component $\Delta T$ is too high in this range and is designated as $\Delta TEB\_high$ in FIG. 5. The speed v of the rail vehicle must therefore be reduced either by the vehicle driver, to whom the critical situation has been indicated on the display unit 9, and/or automatically by the control unit 8, specifically at best to a maximum of $$v = 100 \frac{\text{km}}{h}.$$

The curve or function r therefore already contains the influence of a notional braking under the braking mode "emergency braking" and therefore already the influence of the second temperature component or temperature difference $\Delta T$ on the brake disk. Therefore, separate curves or functions r are formed for each of the above-mentioned braking modes in question and stored, for example, as characteristic curves in the computing unit 7.

Driving at the "thermal limit" with the optimum or maximum-permitted speed vopt therefore permits optimum utilization of the thermal load capacity of the brake disc 1 of the disc brake under the condition that the permitted friction-element maximum temperature Tmax of the brake disc 1 is not exceeded even by notional braking. This optimization is also achieved by considering the actual load of the train, not the maximum-permitted load. Despite the temperature-controlled procedure described above, the timetable must of course always be adhered to, i.e. stations must not be approached faster than usual. However, accumulated delays can be recovered by driving faster between stations.

It also does not always have to be the case that the vehicle is driven at the optimum speed vopt. It could also already be sufficient for an operator of the rail vehicle that the brake discs in the train never reach critical temperature ranges, i.e. slower driving is also accepted.

Optionally, the local optimum temperature vopt_local is determined not only for one disc brake but, for example, for a plurality or all of the disc brakes of the rail vehicle, wherein "local" refers to the position of the particular disc brake in the rail vehicle.

Then, in a step 500, a criteria-based evaluation of the local optimum temperatures vopt_local of the disc brakes and a consolidation to a rail-vehicle-wide or train-wide optimum speed vopt is performed.

For example, for consolidation, the lowest or smallest local optimum speed v_opt_local_min among the local optimum speeds v_opt_local of all the disc brakes can be used as the optimum speed vopt of the rail vehicle.

This optimum speed can then be displayed to the vehicle driver on the display unit 9 in a step 600. In addition, warning or alarm signals can be displayed on the display unit 9, for example, when critical temperature ranges of the disc brakes are reached. Also, a currently highest temperature, for example the currently highest predictive temperature Tpred and/or the highest first temperature portion Tcurrent of the relevant disc brake and the localization of the relevant disc brake could be displayed, for example cyclically. Lastly, a display, in particular cyclic display, of the particular optimum speed vopt of the rail vehicle is also conceivable.

In addition or as an alternative to step 600, in a step 700 the current speed v can be adjusted to the determined optimum speed vopt by the control unit 8.

It is clear that the method described above can be applied to brake blocks instead of to brake discs of disc brakes, as well as to any type of friction brake.

LIST OF REFERENCE SIGNS 1 first friction element
2 second friction element
3 linkage
4 brake cylinder
5 piston
6 compressed air connections
7 computing unit
8 control unit
9 display unit
10 travel speed sensor
11 braking pressure sensor
12 ambient temperature sensor
13 time measuring device
Tcurrent first temperature component
$\Delta T$ second temperature component
Tpred predictive friction-element temperature
Tmax permitted friction-element maximum temperature
vopt optimum or maximum-permissible driving speed
v_opt_local local optimum or maximum-permitted driving speed
r functional relationship between the optimum speed vopt and the first temperature component Tcurrent of the predictive friction-element temperature

The invention claimed is:

1. A method for determining an optimum or maximum-permissible speed of a rail vehicle depending on a thermal condition of at least one friction element of at least one friction brake of the rail vehicle, the method comprising:

detecting at least one parameter characterizing a current operating situation of the rail vehicle;

determining or estimating a first influence on the thermal condition of the at least one friction element based on the current operating situation of the rail vehicle;

determining or estimating a second influence on the thermal condition of the at least one friction element based on the current operating situation of the rail vehicle;

determining the optimum or maximum-permissible speed of the rail vehicle so that, at the at least one friction element under the first influence and under the second influence, a permitted friction-element maximum temperature of the at least one friction element is not exceeded, or the permitted friction-element maximum temperature of the at least one friction element is substantially obtained, wherein the second influence, in addition to the first influence, influences the thermal condition of the at least one friction element when braking with a defined braking mode is carried out notionally or theoretically in the current operating situation of the rail vehicle.

2. The method of claim 1, wherein:

the thermal condition of the at least one friction element is represented by a predictive friction-element temperature of the at least one friction element, which consists of a first temperature component and a second temperature component, the first temperature component of the predictive friction-element temperature is estimated or determined as the first influence on the basis of the current operating situation of the rail vehicle, a functional relationship is defined between the first temperature component and the optimum or maximum-permissible speed of the rail vehicle, in which the second temperature component of the predictive friction-element temperature is taken into account as a second influence, and the optimum speed of the rail vehicle is determined on the basis of the functional relationship.

3. The method of claim 1, wherein:

the thermal condition of the at least one friction element is represented by a predictive friction-element temperature of the at least one friction element;

as a first influence, a first temperature component of the predictive friction-element temperature is estimated or determined on the basis of the current operating situation of the rail vehicle, as a second influence, a second temperature component of the predictive friction-element temperature is estimated or determined, which would occur in addition to the first temperature component at the at least one friction element if braking with a defined braking mode were to be carried out notionally or theoretically in the current operating situation of the rail vehicle, and the optimum or maximum-permissible speed of the rail vehicle is determined in such a way that a sum of the first temperature component and the second temperature component is smaller than a permitted friction-element maximum temperature of the at least one friction element, or substantially corresponds to the permitted friction-element maximum temperature of the at least one friction element.

4. The method of claim 2, wherein, in response to the sum of the first temperature component and the second temperature component being less than the permitted friction-element maximum temperature, the current speed of the rail vehicle is increased until it substantially corresponds to the optimum or maximum-permitted speed, or in response to the sum of the first temperature component and the second temperature component being greater than the permitted friction-element maximum temperature, the current speed of the rail vehicle is reduced in the current operating situation until it substantially corresponds to the optimum or maximum-permissible speed.

5. The method of claim 2, wherein, in response to determination that the first temperature component alone is already greater than the permitted friction-element maximum temperature of the at least one friction element, a warning signal and/or a diagnostic signal is generated, and/or the current speed of the rail vehicle is reduced until the first temperature component is less than or equal to the permitted friction-element maximum temperature of the at least one friction element.

6. The method of claim 1, wherein the optimum speed of the rail vehicle is automatically set by a control device, which controls the traction and/or the brake of the rail vehicle, and/or is indicated visually and/or acoustically on a display device.

7. The method of claim 1, wherein the parameter characterizing the current operating situation is at least one of the following parameters: the current speed of the rail vehicle, the current braking force, the current braking torque, the current braking pressure, the ambient temperature of the rail vehicle, the current load and/or loading of the rail vehicle, an uphill or downhill gradient of the route traveled by the rail vehicle, or a service braking, with a braking effect that is lower than the braking effect for the defined braking mode.

8. The method of claim 1, wherein the at least one friction element includes a brake disk and/or a brake pad of a disk brake of the friction braking system, or a wheel tread and/or a brake block of a block brake unit of the friction braking system.

9. The method of claim 1, wherein the first influence on the thermal condition of the at least one friction element is estimated based on the current operating situation of the rail vehicle by a model and/or is determined based on the sensor signals of a sensor device of the rail vehicle.

10. The method of claim 1, wherein the defined braking mode includes at least one of the following braking modes: an emergency braking, an automatic braking, a rapid braking, a hazard braking.

11. The method of claim 1, wherein the rail vehicle comprises a plurality of friction brakes each having at least one friction element, and wherein, for each of the plurality of friction brakes a local optimum or maximum-permissible speed is determined, and the smallest local optimum or maximum-permissible speed among the local optimum or maximum-permissible speeds of the plurality of friction brakes is used as the optimum or maximum-permissible speed of the rail vehicle.

12. The method of claim 1, wherein the rail vehicle comprises a plurality of friction brakes each having at least one friction element, wherein, for each of the plurality of friction brakes a local optimum or maximum-permissible speed is determined, and wherein, an optimum or maximum-permissible speed of the rail vehicle determined from the local optimum or maximum-permissible speeds according to fixed criteria is used as the optimum or maximum-permissible speed of the rail vehicle.

13. The method of claim 1, wherein a current speed of the rail vehicle is adapted to the optimum or maximum-permissible speed.

* * * * *